US 12,098,933 B2

(12) United States Patent
Isomura et al.

(10) Patent No.: US 12,098,933 B2
(45) Date of Patent: *Sep. 24, 2024

(54) GENERATION DEVICE, GENERATION METHOD, AND GENERATION PROGRAM

(71) Applicant: NIPPON TELEGRAPH AND TELEPHONE CORPORATION, Tokyo (JP)

(72) Inventors: Atsushi Isomura, Tokyo (JP); Kazuhiro Miyahara, Tokyo (JP); Ichibe Naito, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 36 days.

This patent is subject to a terminal disclaimer.

(21) Appl. No.: 17/908,884

(22) PCT Filed: Mar. 5, 2020

(86) PCT No.: PCT/JP2020/009541
§ 371 (c)(1),
(2) Date: Sep. 1, 2022

(87) PCT Pub. No.: WO2021/176678
PCT Pub. Date: Sep. 10, 2021

(65) Prior Publication Data
US 2023/0088390 A1   Mar. 23, 2023

(51) Int. Cl.
*G01C 21/00* (2006.01)
*G06T 17/20* (2006.01)

(52) U.S. Cl.
CPC ..... *G01C 21/3867* (2020.08); *G01C 21/3815* (2020.08); *G06T 17/20* (2013.01)

(58) Field of Classification Search
CPC .......... G01C 21/3815; G01C 21/3867; G06V 20/588; G06T 2210/61; G06T 11/203; G06T 17/20; G06T 17/05
See application file for complete search history.

(56) References Cited

U.S. PATENT DOCUMENTS

| | | | |
|---|---|---|---|
| 9,274,525 B1 * | 3/2016 | Ferguson | G01S 7/52004 |
| 2018/0276483 A1 * | 9/2018 | Zeng | G06T 7/521 |
| 2019/0031236 A1 * | 1/2019 | Shiraishi | B62D 6/04 |
| 2020/0047768 A1 * | 2/2020 | Hamada | B60W 50/029 |
| 2020/0202593 A1 * | 6/2020 | Black | G06T 11/206 |
| 2020/0380271 A1 * | 12/2020 | Mittal | G05D 1/0088 |
| 2021/0058608 A1 * | 2/2021 | Jung | H04N 13/271 |
| 2021/0163010 A1 * | 6/2021 | Takabayashi | G08G 1/16 |
| 2021/0183169 A1 * | 6/2021 | Borras | G07B 15/063 |

OTHER PUBLICATIONS

ArcGIS Pro "Buffer" [searched on Feb. 20, 2020] Internet <URL: https://pro.arcgis.com/ja/pro-app/tool-reference/analysis/buffer.htm>.

* cited by examiner

*Primary Examiner* — Phi Hoang

(57) ABSTRACT

A generation device includes processing circuitry configured to receive a plurality of inputs of road map data including longitude/latitude data on lane information indicating a center line of a lane, longitude/latitude data on a road shoulder line, and longitude/latitude data on a lane marker, and refer to the road map data and generate a first polygon indicating a region of a lane based on a plurality of intersections on the lane marker or the road shoulder line crossed by a vertical line from the lane information.

6 Claims, 17 Drawing Sheets

CASE OF 15 DIGITS FOR LONGITUDE AND
14 DIGITS FOR LATITUDE
(1.25 km × 1.25 km)

(a)

CASE OF 18 DIGITS FOR LONGITUDE AND
17 DIGITS FOR LATITUDE
(150 m × 150 m)

(b)

1 MESH OF SPATIAL INDEX

CASE OF 15 DIGITS FOR LONGITUDE AND
14 DIGITS FOR LATITUDE
(1.25 km × 1.25 km)

GENERATION DEVICE, GENERATION METHOD, AND GENERATION PROGRAM

CROSS-REFERENCE TO RELATED APPLICATIONS

This application is a U.S. National Stage Application filed under 35 U.S.C. § 371 claiming priority to International Patent Application No. PCT/JP2020/009541, filed on 5 Mar. 2020, the disclosure of which is hereby incorporated herein by reference in its entirety.

TECHNICAL FIELD

The present invention relates to a generation device, a generation method, and a generation program.

BACKGROUND ART

In the related art, an inside/outside determination technique that determines whether certain coordinates are included within a certain polygon has been applied to a case where whether a polygon representing a road region includes geographic coordinates of a vehicle or the like is determined.

In related art, a method has been proposed in which the center line of a road is set as the center and a polygon having a predetermined width from this center line is generated as a polygon representing a road region (see, for example, NPL 1).

CITATION LIST

Non Patent Literature

NPL 1: ArcGIS Pro "Buffer", [searched on Feb. 20, 2020], Internet <URL: pro.arcgis.com/ja/pro-app/tool-reference/analysis/buffer.htm>

SUMMARY OF THE INVENTION

Technical Problem

Here, determining on which lane of a road a vehicle is located is required for lane-by-lane congestion detection and the like. However, typically there is no lane in the center of a lane, and thus a sensor device such as an in-vehicle Light Detection and Ranging (LIDAR) cannot observe the center line of the lane, and related-art methods have constraints that the generation range of a polygon is limited. That is, because there is no data on the center line of the lane, the related-art methods fail to generate a polygon indicating the lane region of the lane, and there is a limit to the accuracy of lane congestion detection and the like.

The present invention has been made in view of the aforementioned circumstances, and an object thereof is to provide a generation device, a generation method, and a generation program capable of generating a polygon indicating the region of a lane.

Means for Solving the Problem

To solve the problem described above and achieve the object, a generation device includes: processing circuitry configured to: receive a plurality of inputs of road map data including longitude/latitude data on lane information indicating a center line of a lane, longitude/latitude data on a road shoulder line, and longitude/latitude data on a lane marker; and refer to the road map data and generate a first polygon indicating a region of a lane based on intersections on the lane marker or the road shoulder line crossed by a vertical line from the lane information.

A generation method is a generation method executed by a generation device. The generation method includes: receiving a plurality of inputs of road map data including longitude/latitude data on lane information indicating a center line of a lane, longitude/latitude data on a road shoulder line, and longitude/latitude data on a lane marker; and referring to the road map data and generating a first polygon indicating a region of a lane based on intersections on the lane marker or the road shoulder line crossed by a vertical line from the lane information.

A non-transitory computer-readable recording medium stores therein a generation program that causes a computer to execute a process including: receiving a plurality of inputs of road map data including longitude/latitude data on lane information indicating a center line of a lane, longitude/latitude data on a road shoulder line, and longitude/latitude data on a lane marker; and referring to the road map data and generating a first polygon indicating a region of a lane based on intersections on the lane marker or the road shoulder line crossed by a vertical line from the lane information.

Effects of the Invention

In accordance with the present invention, a polygon indicating the region of a lane can be generated.

DESCRIPTION OF EMBODIMENTS

Embodiments of a generation device, a generation method, and a generation program according to the present application will be described in detail with reference to the drawings. The present invention is not limited by the embodiment described below.

Embodiment

First of all, an embodiment will be described. A generation device according to the present embodiment refers to road map data including longitude/latitude data on lane information indicating a center line of a lane, longitude/latitude data on a road shoulder line, and longitude/latitude data on a lane marker, and generates a lane polygon (first polygon) indicating a region of a lane based on intersections on the lane marker or the road shoulder line crossed by a vertical line from the lane information.

Configuration of Communication System

Figure 1:
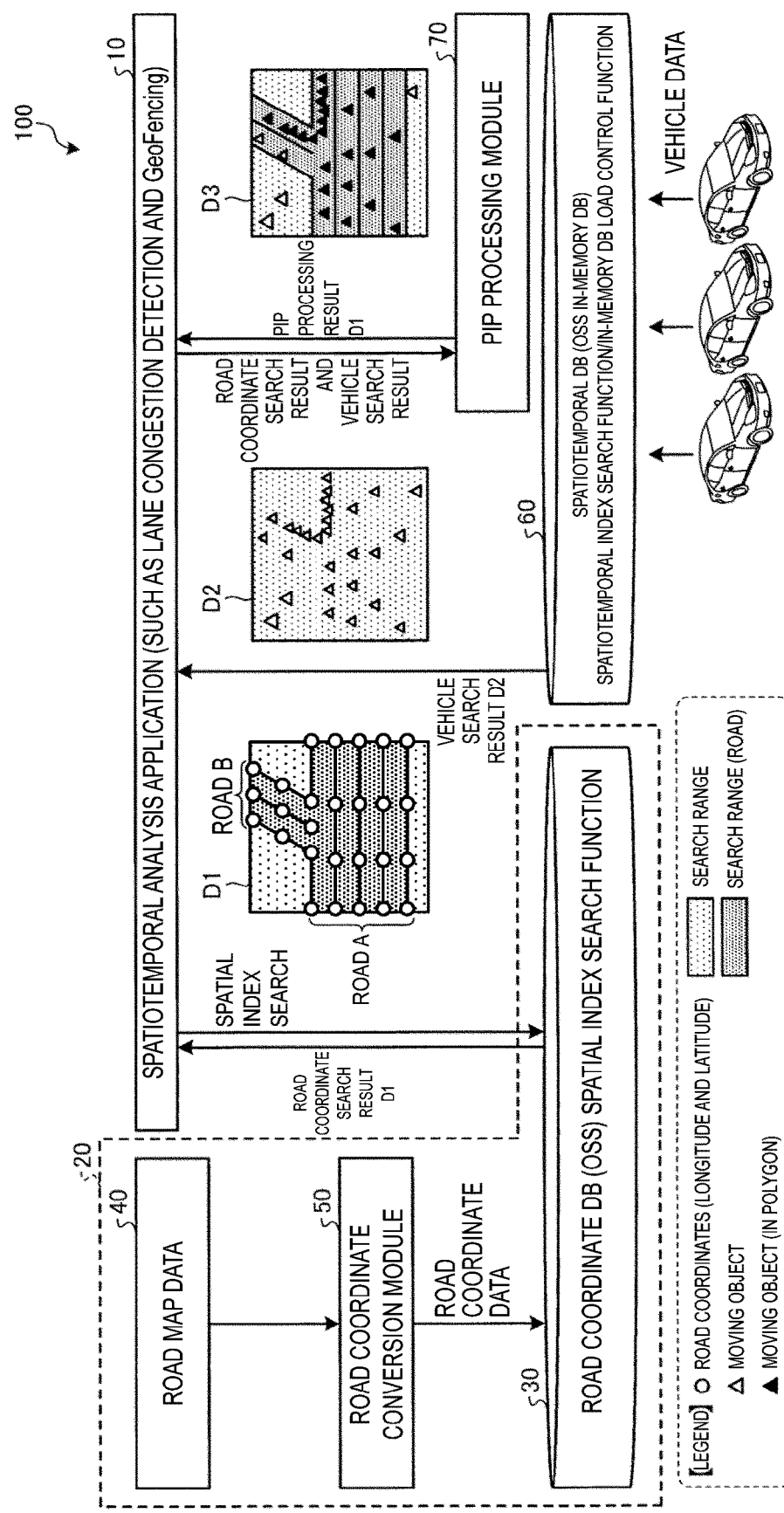
FIG. 1 is a block diagram illustrating an example of a configuration of a communication system according to an embodiment.

FIG. 1 is a diagram illustrating an example of a configuration of a communication system according to the embodiment. For example, as illustrated in FIG. 1, a communication system 100 in the embodiment provides a PIP processing result D3 to a spatiotemporal analysis application 10, such as a lane congestion detection or GeoFencing, installed in a terminal device (not illustrated). The PIP processing result D3 is a result of determining a position of a vehicle in each lane in a certain road.

In the communication system 100, in accordance with spatial index search performed by the spatiotemporal analysis application 10, a road coordinate database (DB) 30 (Open Source Software (OSS)) in a road coordinate management system 20 outputs a road coordinate search result D1 including the lane polygon representing the lane region. A spatiotemporal DB 60 that accumulates information regarding vehicle data outputs a vehicle search result D2 including the coordinates of the vehicle, to the spatiotemporal analysis application 10.

Then, upon receiving the road coordinate search result D1 and the vehicle search result D2 from the spatiotemporal analysis application 10, a PIP processing module 70 executes PIP processing to determine in which lane of the road the vehicle is positioned, and outputs the PIP processing result D3. The spatiotemporal analysis application 10 performs the lane congestion detection, GeoFencing, or the like based on this PIP processing result D3.

Road Coordinate Management System

Figure 2:
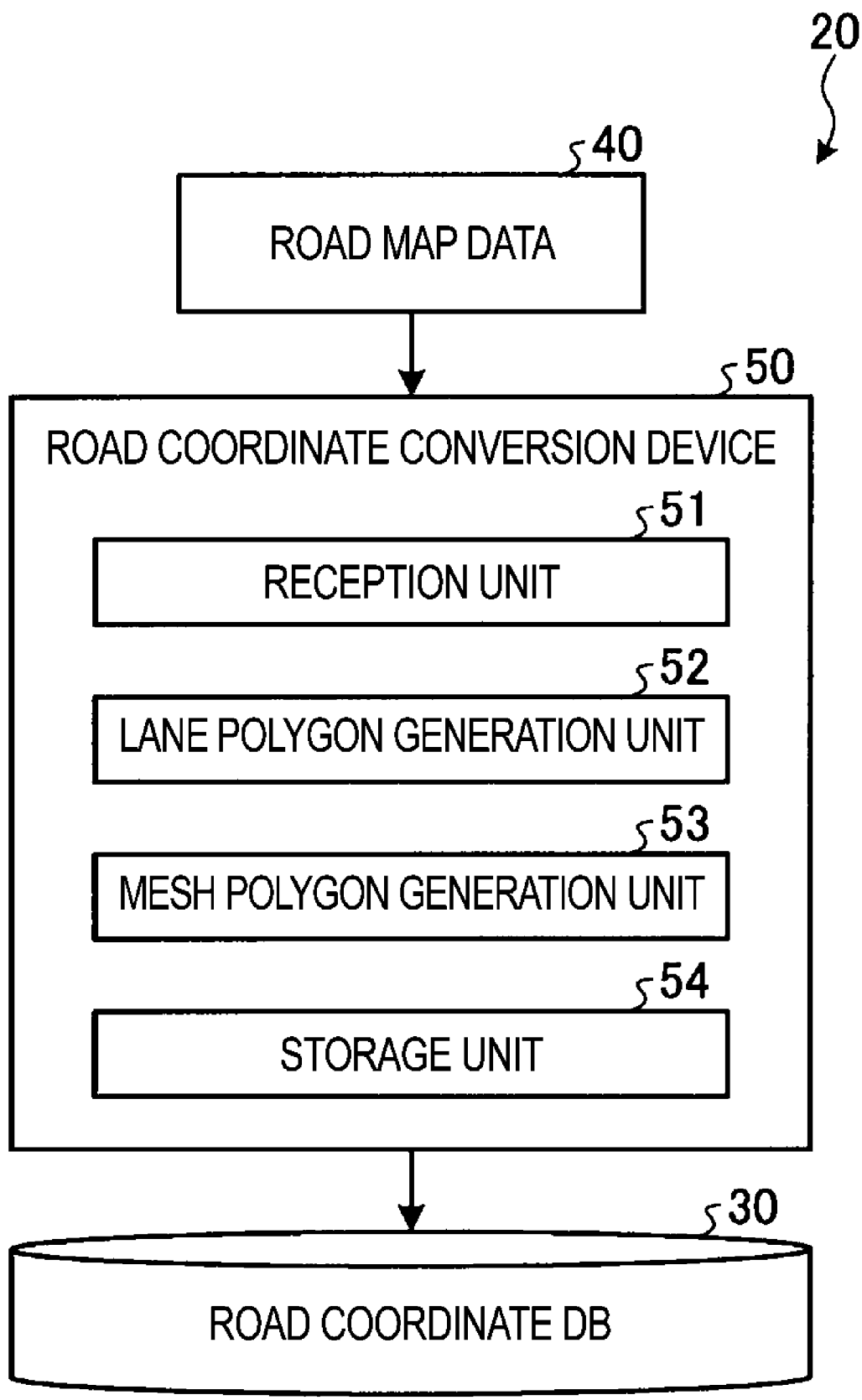
FIG. 2 is a diagram illustrating an example of a configuration of a road coordinate management system illustrated in FIG. 1.

Next, the road coordinate management system 20 will be described. FIG. 2 is a diagram illustrating an example of a configuration of the road coordinate management system 20 illustrated in FIG. 1. As illustrated in FIG. 2, the road coordinate management system 20 includes a road coordinate conversion device 50 and a road coordinate DB 30.

The road coordinate conversion device 50 stores, in the road coordinate DB 30, a lane polygon indicating the region of a lane generated using road map data 40 including longitude/latitude data on lane information indicating the center line of a lane, longitude/latitude information on a road shoulder line, and longitude/latitude information on a lane marker and a mesh polygon (second polygon) for representing a spatial index in association with each other. The lane polygon is data indicating the coordinates of each vertex of a polygon indicating the lane region. The mesh polygon is data indicating coordinates of each vertex of the spatial index with a polygon shape divided in accordance with a predetermined accuracy.

The road coordinate DB 30 stores the mesh polygon and the lane polygon in association with each other. The road coordinate DB 30 has a spatial index search function, searches for the lane polygon using the spatial index as a search key, and outputs the result of the search as the road coordinate search result D1.

Road Map Data

Next, the road map data 40 will be described. The road map data 40 stores data pieces including data on a road ID, a lane ID, the number of lanes, the longitude and the latitude of the road center, the longitude and the latitude of the lane center, and the longitude and the latitude of the lane marker (white lines indicating ends of the road and a dotted line).

In the road map data 40, the longitude/latitude data is stored with attributes such as lane information, roadway information, lane marker, road shoulder line, intersection region, and road sign. The road coordinate conversion device 50 generates a polygon using lane information, roadway information, and longitude/latitude data of lane markers and road shoulder lines, among the data included in the road map data 40.

Road Coordinate Conversion Device

Next, referring back to FIG. 2, a configuration of the road coordinate conversion device 50 will be described. Note that the road coordinate conversion device 50 is, for example, implemented by a computer including a read only memory (ROM), a random access memory (RAM), a central processing unit (CPU), and the like reading a predetermined program and by the CPU executing the predetermined program. The road coordinate conversion device 50 has a communication interface that transmits and receives various pieces of information to and from another apparatus connected via a network or the like. For example, the road coordinate conversion device 50 includes a network interface card (NIC) or the like, and performs communication with another apparatus via a telecommunication line such as a local area network (LAN) or the Internet.

Figure 3:
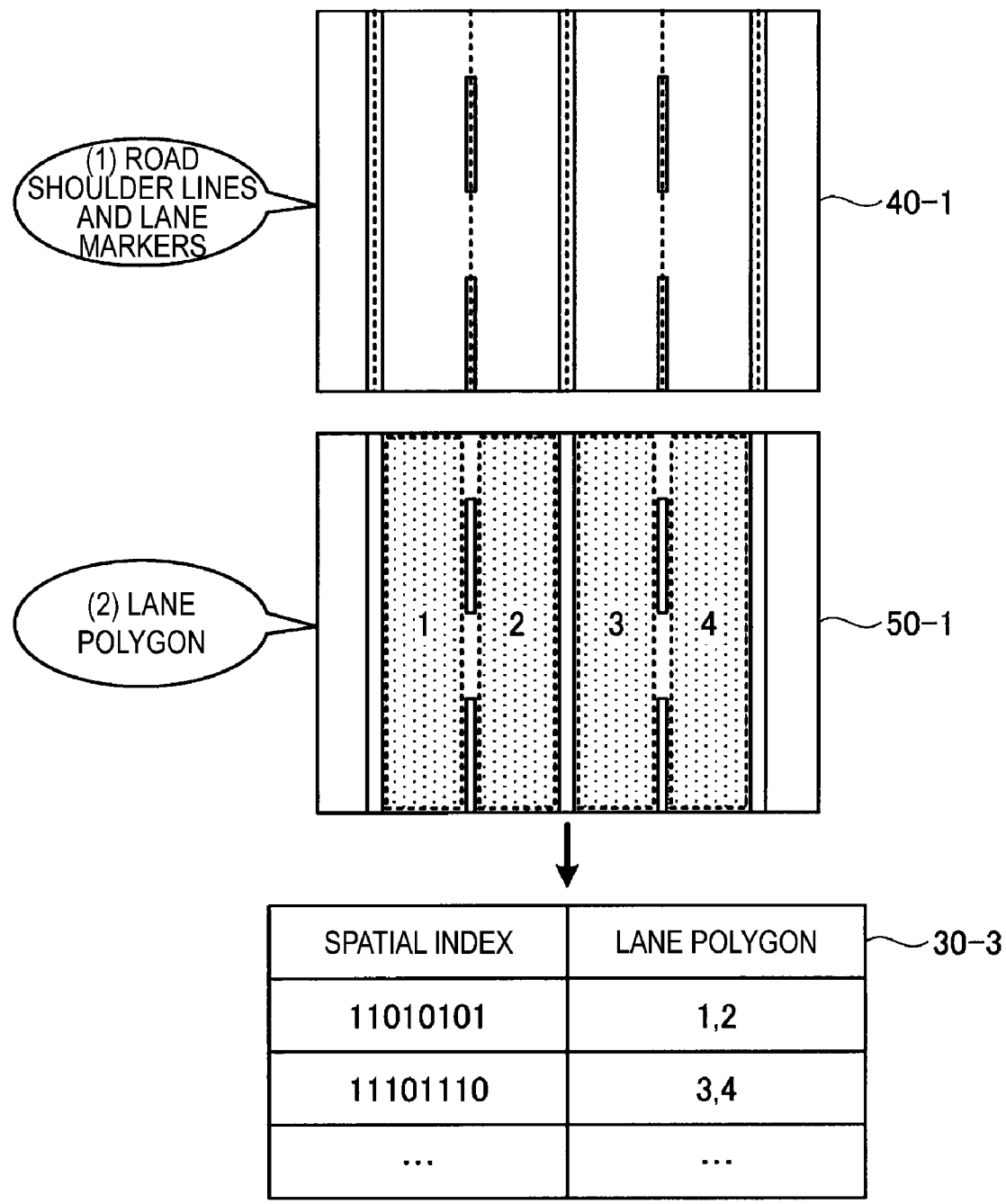
FIG. 3 is a diagram schematically illustrating processing executed by components of a road coordinate conversion device illustrated in FIG. 2.

As illustrated in FIG. 2, the road coordinate conversion device 50 includes a reception unit 51, a lane polygon generation unit 52 (first generation unit), a mesh polygon generation unit 53 (second generation unit), and a storage unit 54. FIG. 3 is a diagram schematically illustrating processing executed by the components of the road coordinate conversion device 50 illustrated in FIG. 2.

The reception unit 51 receives input of road map data 40 including longitude/latitude data on lane information indicating the center line of a lane, longitude/latitude data on a road shoulder line, longitude/latitude data on a lane marker.

The road map data 40 includes latitude/longitude data 40-1 on the road shoulder line, the lane marker, and the like, as illustrated in FIG. 3 for example.

The lane polygon generation unit 52 refers to the road map data 40 and generates a lane polygon (see, for example, 50-1 in FIG. 3) indicating a lane region based on the intersection on the lane marker or the road shoulder line crossed by a vertical line in the lane information. Specifically, the lane polygon generation unit 52 generates a lane polygon by combining the intersections on the lane markers or the road shoulder lines crossed by the vertical line in the lane information.

The mesh polygon generation unit 53 generates a mesh polygon representing a spatial index.

The storage unit 54 stores, in the road coordinate DB 30, data (see, for example, 30-3 in FIG. 3) in which the data (spatial index) on the mesh polygon and the data on the lane polygon corresponding to the mesh polygon are associated with each other.

In this manner, the road coordinate conversion device 50 performs polygon generation, by generating the lane polygon using a white line such as the road shoulder line and the lane marker, and then performing filtering using the spatial index.

Flow of Processing Executed by Road Coordinate Conversion Device

Now, a flow of processing executed by the road coordinate conversion device 50 will be described in detail. FIGS. 4 to 13 are diagrams illustrating a flow of the processing executed by the road coordinate conversion device 50 illustrated in FIG. 2.

Figure 4:
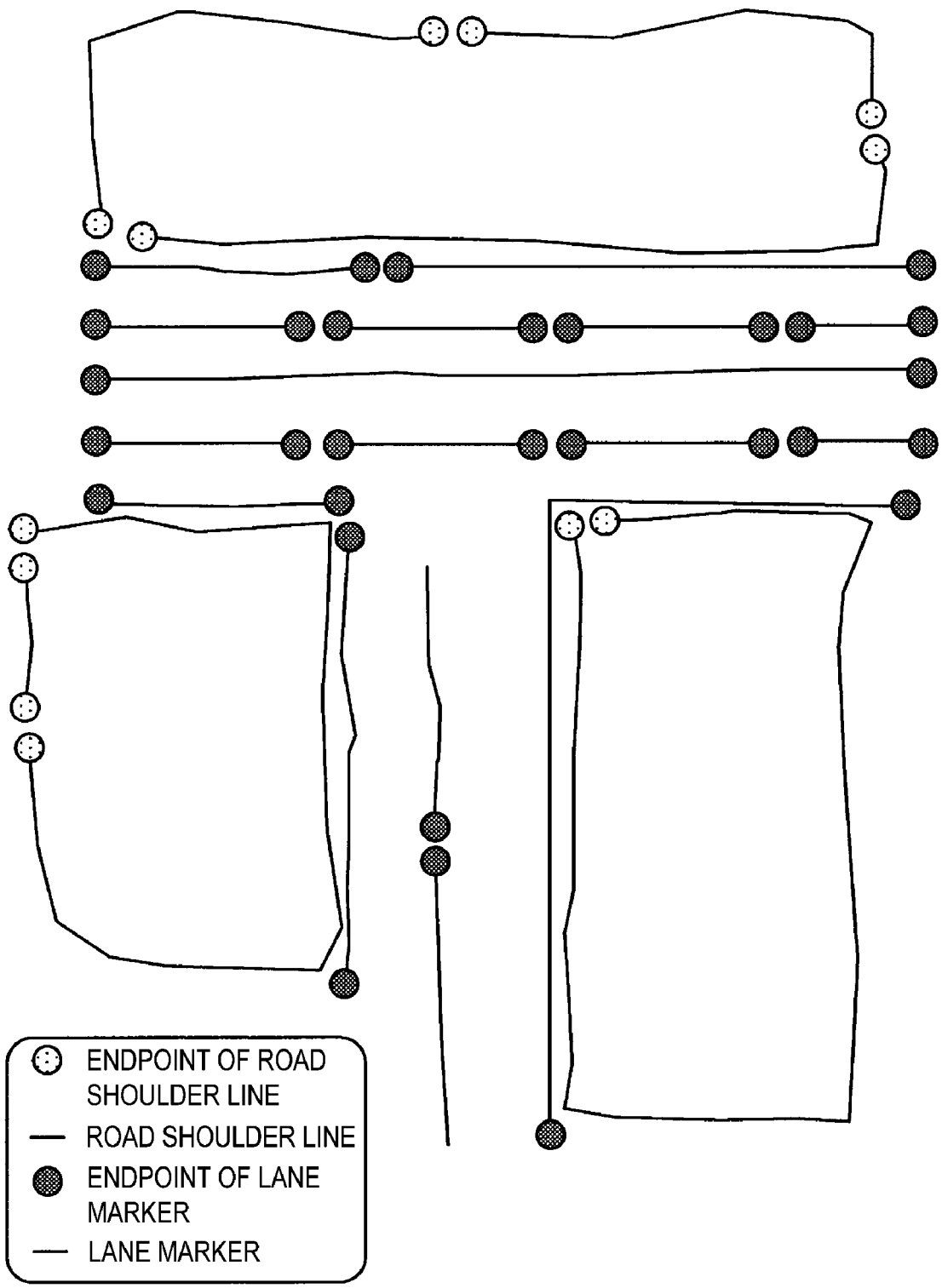
FIG. 4 is a diagram illustrating a flow of the processing executed by the road coordinate conversion device illustrated in FIG. 2.
Figure 5:
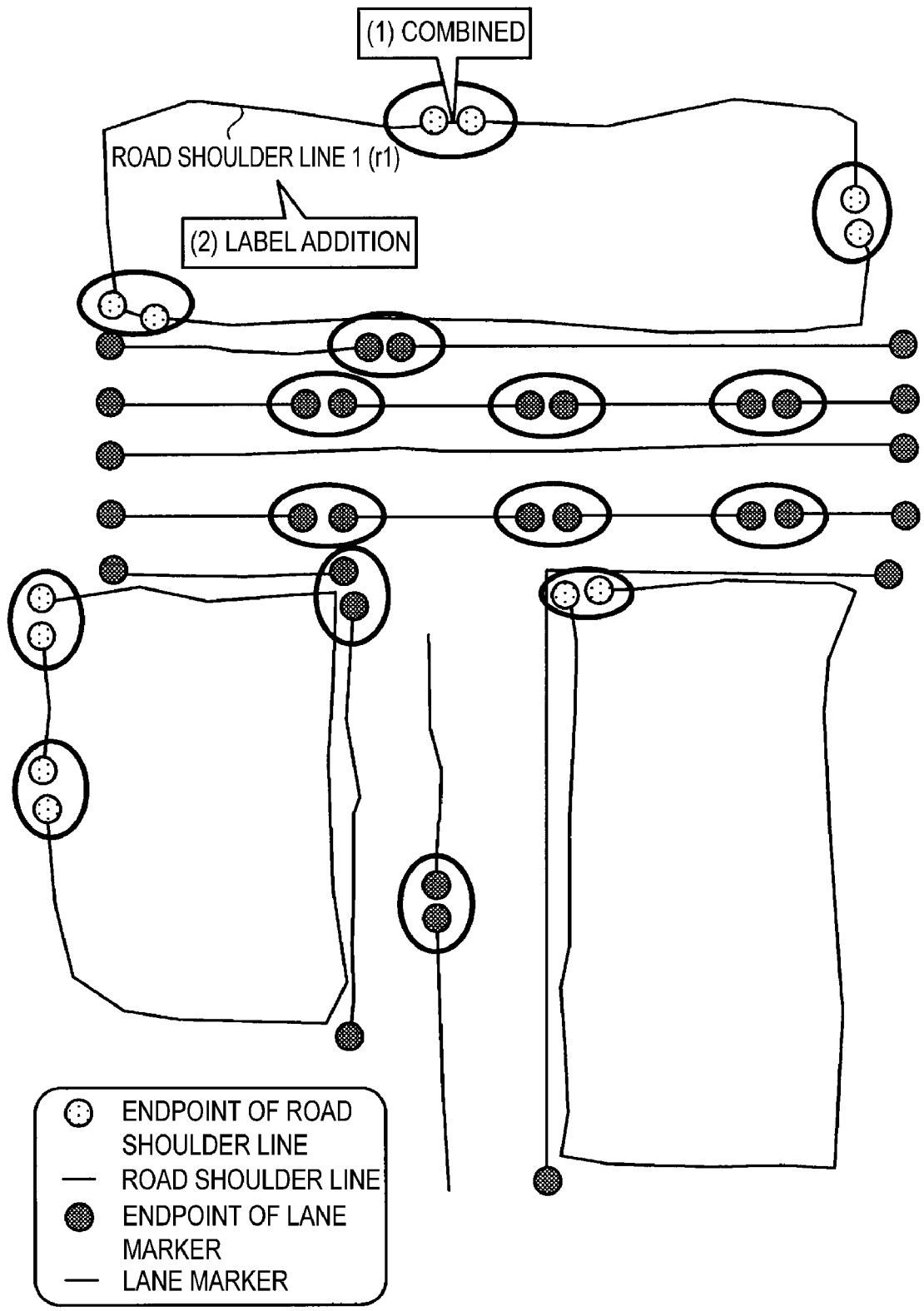
FIG. 5 is a diagram illustrating a flow of the processing executed by the road coordinate conversion device illustrated in FIG. 2.

First of all, how a lane polygon is generated will be described with reference to FIGS. 4 to 9. FIG. 4 is a diagram in which, based on the longitude/latitude data on the road shoulder line and the longitude/latitude data on the lane marker of the road map data 40 used in the processing, each road shoulder line and each lane marker are displayed two dimensionally.

As illustrated in FIG. 4, the road map data 40 often has road shoulder lines and lane markers partially depicted. Thus, the lane polygon generation unit 52 generates one road shoulder line by combining endpoints of two adjacent road shoulder lines when the distance between the endpoints of the two adjacent road shoulder lines is equal to or shorter than L (first distance) (see (1) in FIG. 5). Then, the lane polygon generation unit 52 adds a label to the generated road shoulder line (see (2) in FIG. 5). For example, the lane polygon generation unit 52 adds a label "r1" to a single road shoulder line "1" obtained by combining endpoints at three locations.

The lane polygon generation unit 52 combines endpoints of two adjacent lane markers when the distance between the endpoints of the two lane markers is equal to or shorter than L (second distance), and adds a label to the resultant lane marker. L is set, for example, to 3 m (average width of the lane). Note that the first distance and the second distance may be set to be different distances depending on the average width of a road or a lane.

Figure 6:
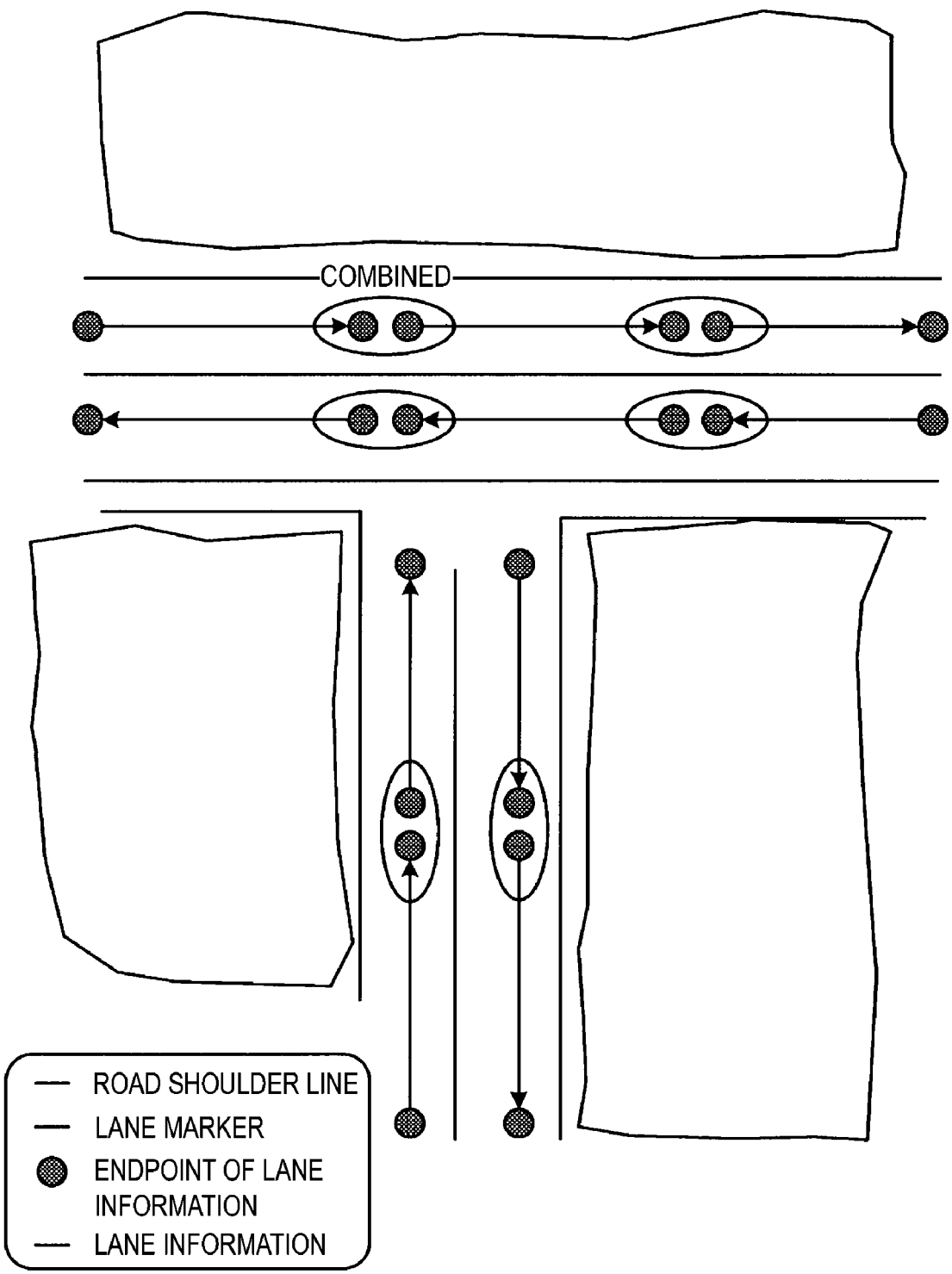
FIG. 6 is a diagram illustrating a flow of the processing executed by the road coordinate conversion device illustrated in FIG. 2.

In addition, as illustrated in FIG. 6, the lane polygon generation unit 52 combines the endpoints in the lane information when the distance the endpoints is 0, and adds a label. Here, the lane information has endpoints arranged in a vehicle traveling direction, and thus combining of "starting point→starting point" and "terminal point→terminal point" is not performed. For example, the combining is performed only when the distance is 0. Note that the condition for the combining is not limited to the case where the distance is 0.

Further, when there are a plurality of pieces of lane information that can be combined, the lane polygon generation unit 52 combines none of them.

The lane polygon generation unit 52 draws, in both directions, a vertical bisector for a section between a point n included in the combined lane information and a point n+1 adjacent to the point n. For example, as illustrated as an example in FIG. 7, the lane polygon generation unit 52 draws a vertical bisector having a length that is approximately 2 m. Note that the length of the vertical bisector is not limited and can be set as appropriate.

Figure 8:
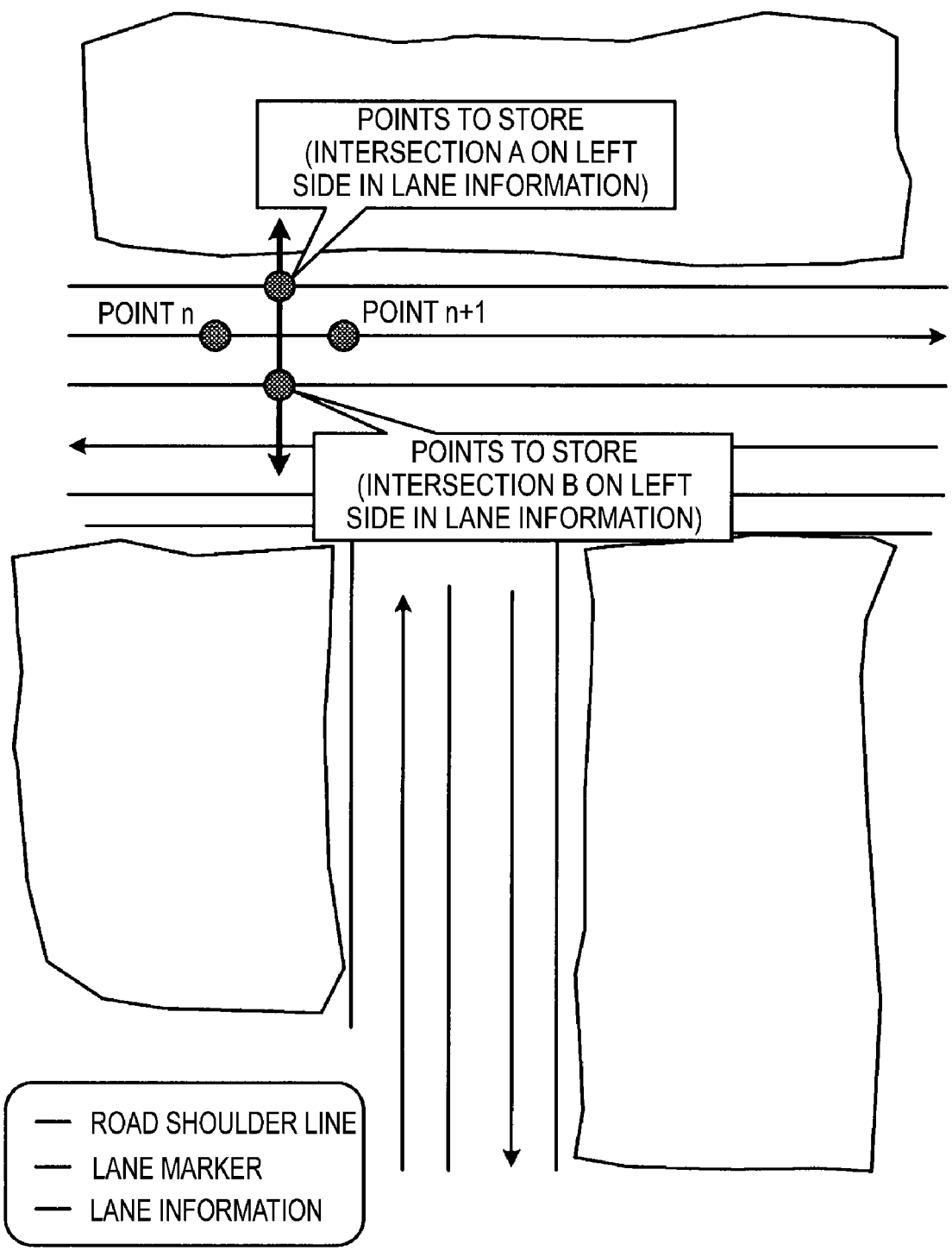
FIG. 8 is a diagram illustrating a flow of the processing executed by the road coordinate conversion device illustrated in FIG. 2.
Figure 9:
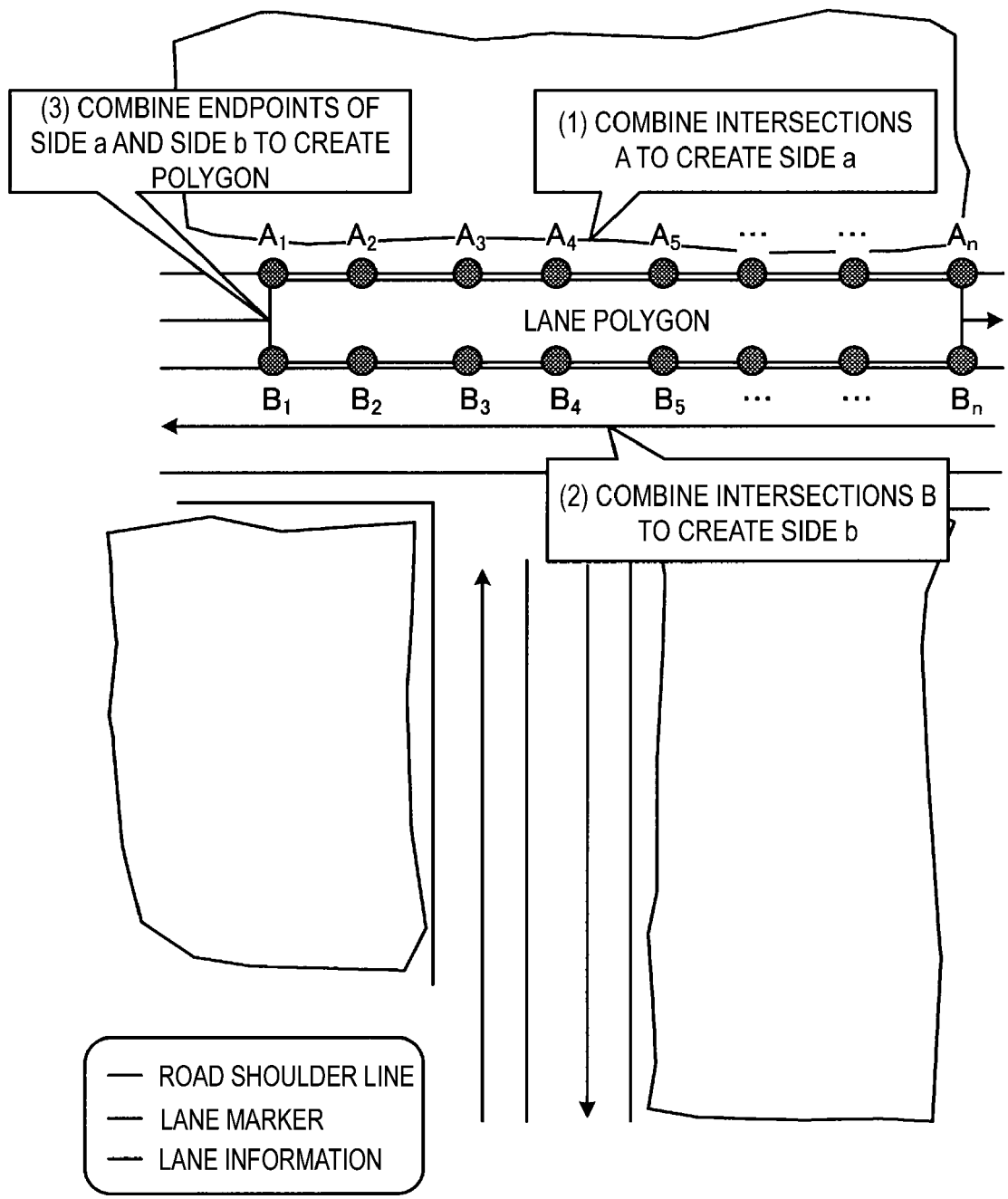
FIG. 9 is a diagram illustrating a flow of the processing executed by the road coordinate conversion device illustrated in FIG. 2.

Next, as illustrated as an example in FIG. 8, the lane polygon generation unit 52 stores the intersections A and B on the lane marker or the road shoulder line first crossed by each vertical bisector, and adds a label. Note that the lane polygon generation unit 52 stores no intersection, if another lane information is first crossed.

Figure 7:
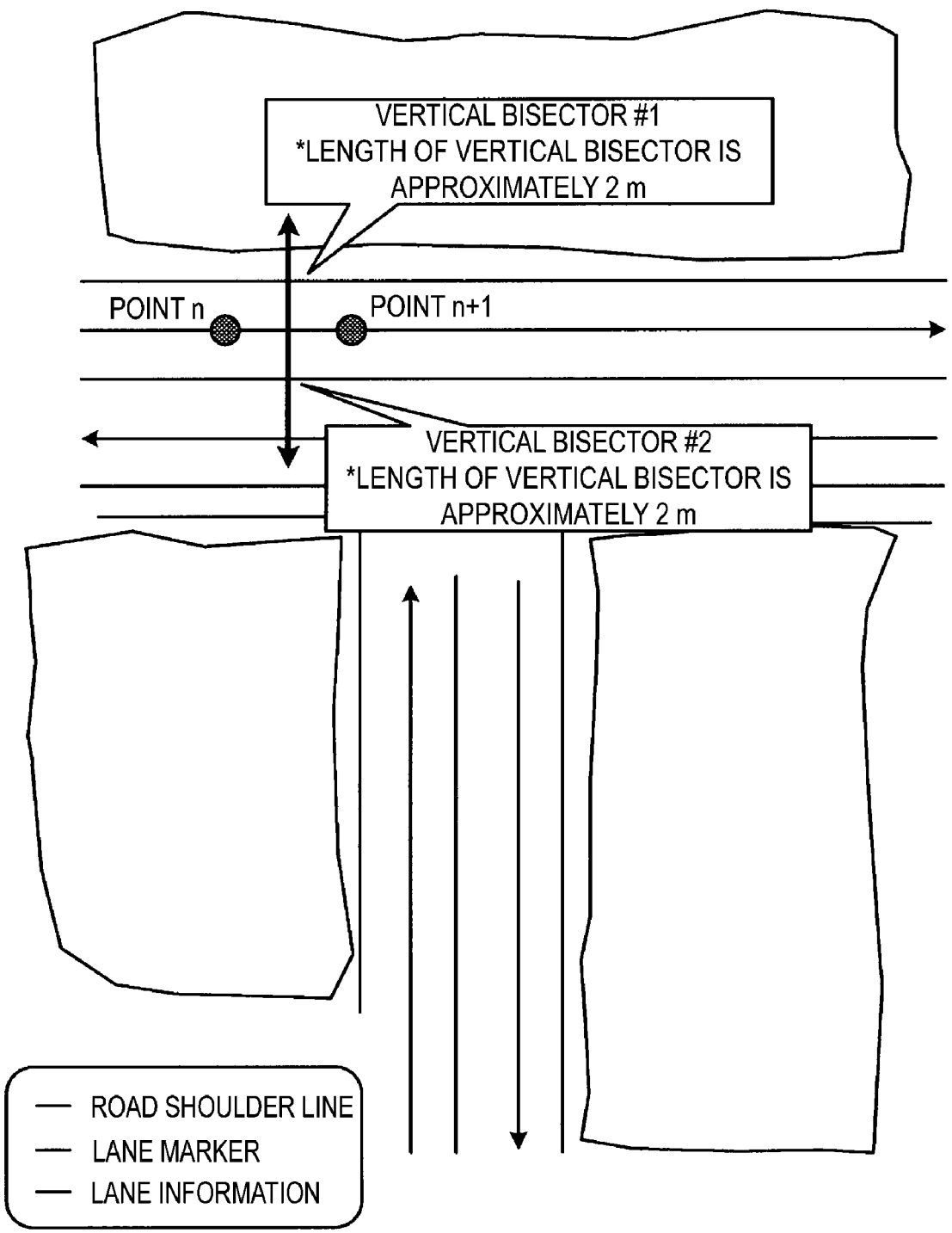
FIG. 7 is a diagram illustrating a flow of the processing executed by the road coordinate conversion device illustrated in FIG. 2.

Then, the lane polygon generation unit 52 repeatedly executes the processing illustrated in FIGS. 7 and 8, with the starting point of the vertical bisector moved by a predetermined distance each time the processing is executed. As a result, the labeled points are set on the lane marker to be separated from one another by a predetermined distance.

Then, the lane polygon generation unit 52 combines points provided with the same label and with the same label plus 1, and generates a lane polygon. For example, as illustrated as an example in FIG. 9, the lane polygon generation unit 52 combines the intersections A to create a side a (see (1) in FIG. 9), combines the intersections B to create a side b (see (2) in FIG. 9), and combines the endpoints of the side a and the side b to create a lane polygon (see (3) in FIG. 9).

In this manner, the lane polygon generation unit 52 generates a plurality of lane polygons from the longitude/latitude data on the lane information, the longitude/latitude data on the road shoulder lines and the lane markers in the road map data.

Figure 11:
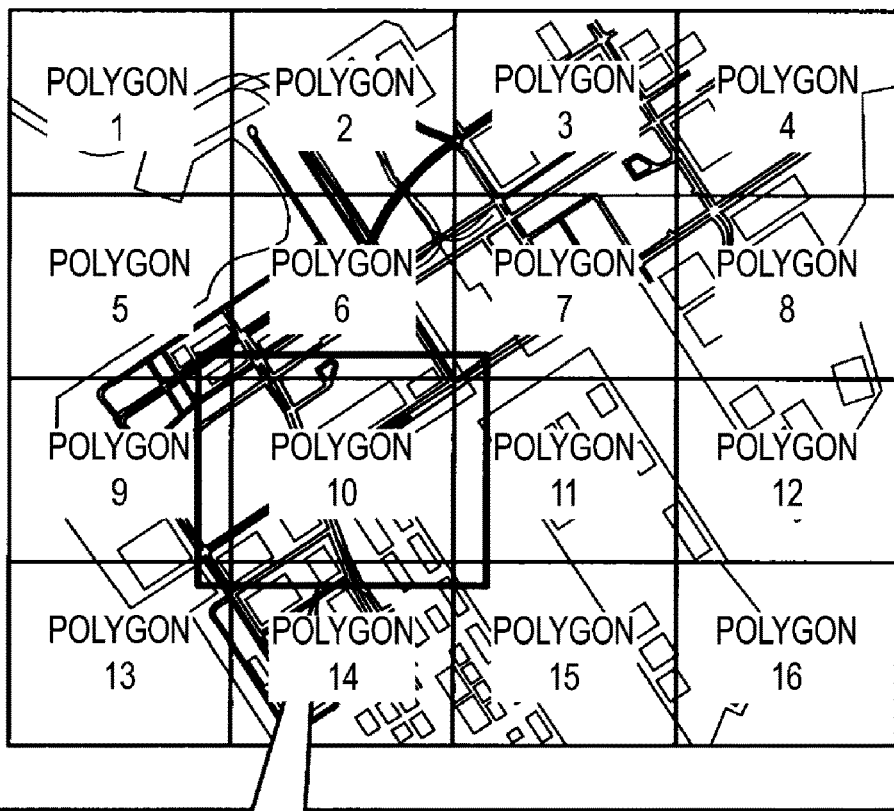
FIG. 11 is a diagram illustrating a flow of the processing executed by the road coordinate conversion device illustrated in FIG. 2.
Figure 11:
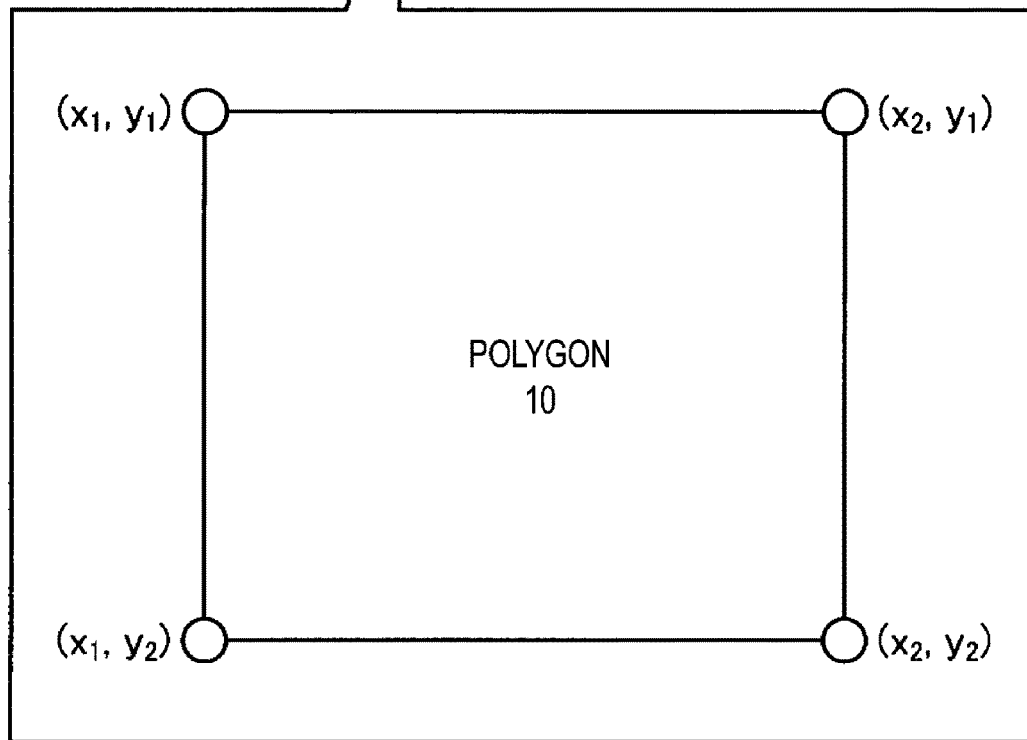
Figure 12:
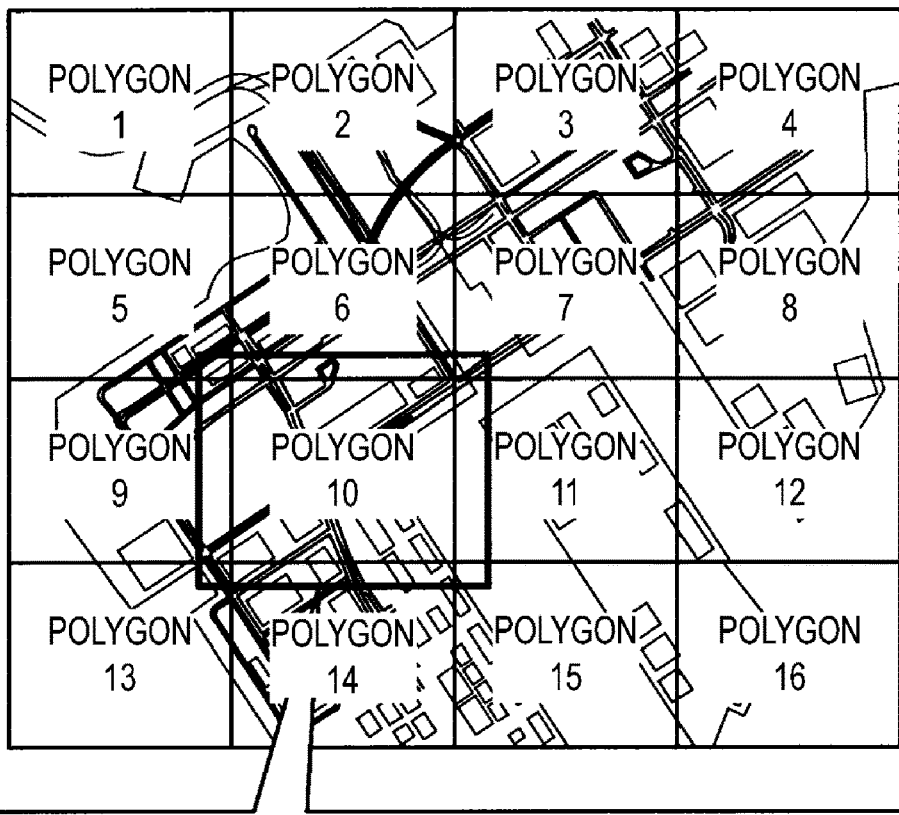
FIG. 12 is a diagram illustrating a flow of the processing executed by the road coordinate conversion device illustrated in FIG. 2.
Figure 12:
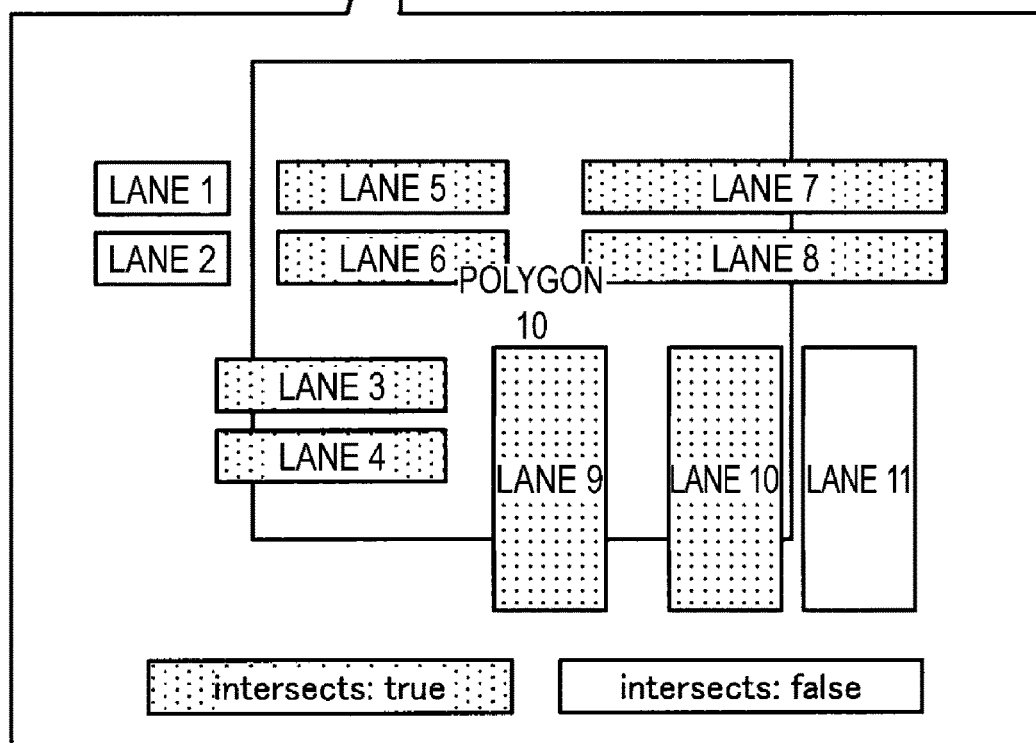

Next, how the mesh polygon generation unit 53 generates a mesh polygon will be described with reference to FIG. 10 to FIG. 12. Upon receiving the input of the accuracy (number of digits) of the spatial index (geohash), the mesh polygon generation unit 53 determines the mesh division size in accordance with the input accuracy.

Figure 10:
FIG. 10 is a diagram illustrating a flow of the processing executed by the road coordinate conversion device illustrated in FIG. 2.
Figure 10:
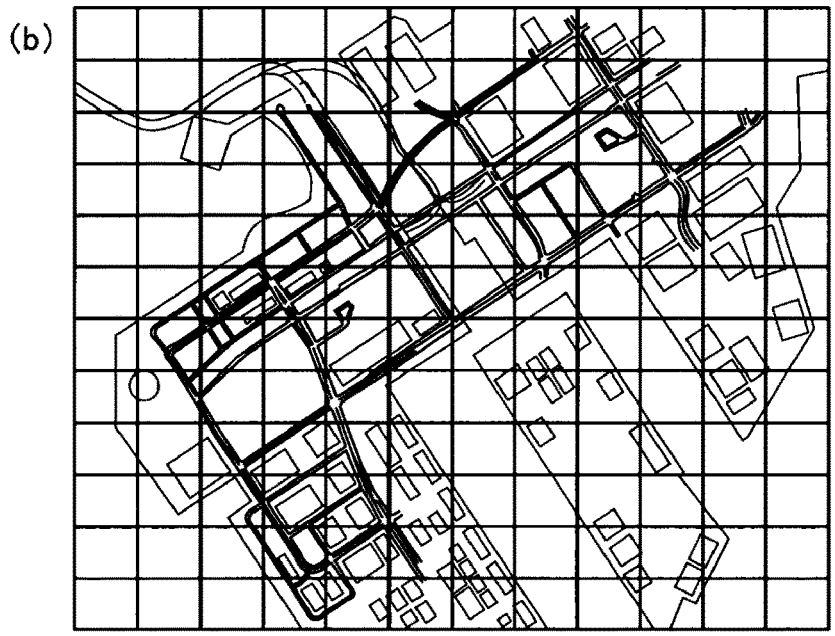
Figure 10:

For example, as illustrated in FIG. 10($a$), upon receiving the input of an accuracy of 15 digits for the latitude and 14 digits for the longitude, the mesh polygon generation unit 53 determines the mesh division size of 1.25 km×1.25 km. For example, as illustrated in FIG. 10($b$), upon receiving the input of an accuracy of 18 digits for the latitude and 17 digits for the longitude, the mesh polygon generation unit 53 determines the mesh division size of 150 m×150 m.

The mesh polygon generation unit 53 then generates a mesh polygon for representing all geohashes in accordance with the determined mesh division. Specifically, as illustrated in FIG. 11, in the case of the accuracy of 15 digits for the latitude and 14 digits for the longitude, the mesh polygon generation unit 53 determines a polygon with the size of 1.25 km×1.25 km. For example, of a plurality of polygons, a polygon 10 has coordinates of the vertices of the polygon set to be (x1,y1), (x2,y1), (x2,y2), and (x1,y2).

Then, the mesh polygon generation unit 53 stores a lane polygon in an "Intersect" relationship with each mesh polygon. An Intersect function according to JIS or the like is assumed as the Intersect. As illustrated in FIG. 12, the mesh polygon generation unit 53 stores lane polygons of lanes 3 to 10.

Figure 13:
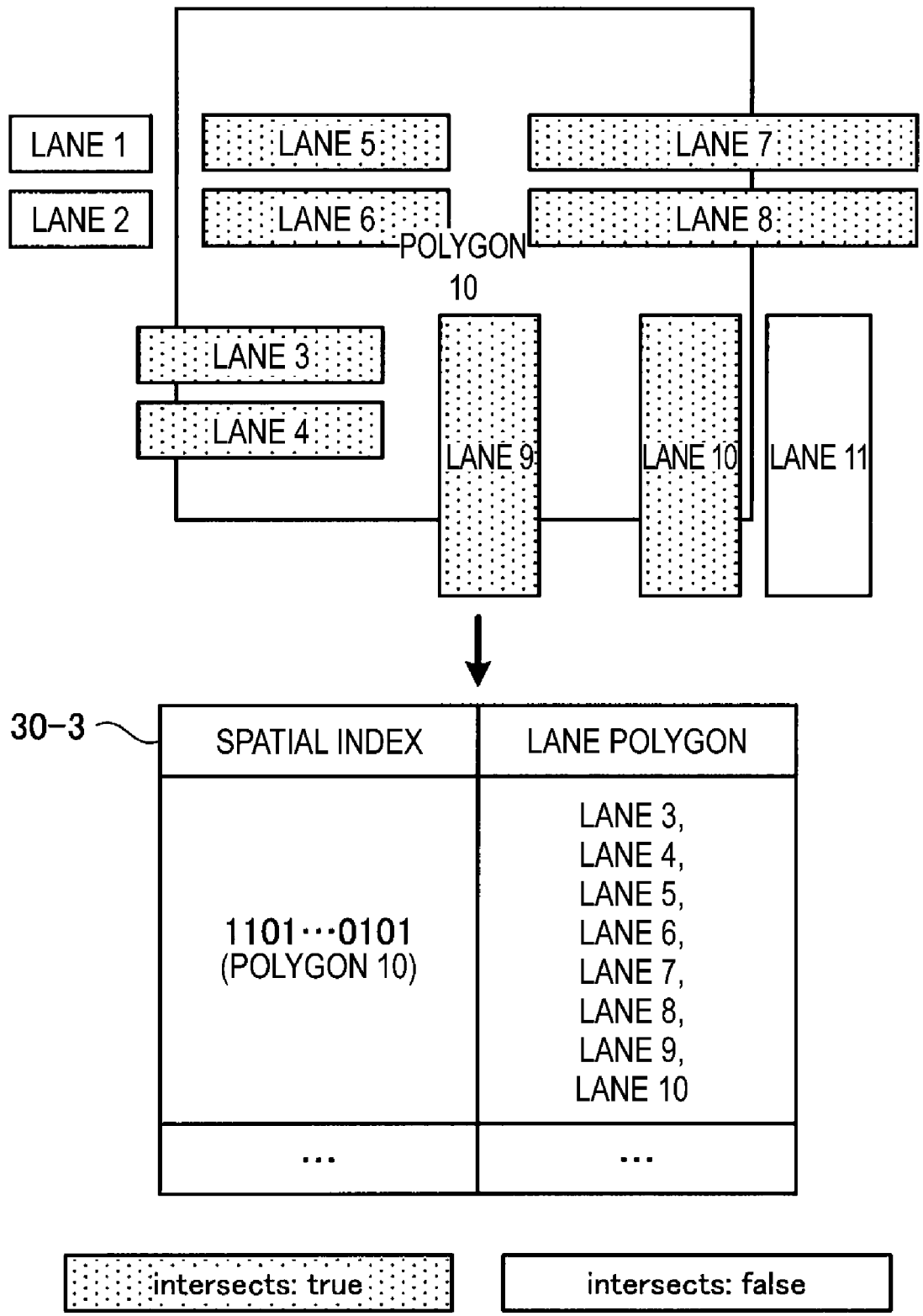
FIG. 13 is a diagram illustrating a flow of the processing executed by the road coordinate conversion device illustrated in FIG. 2.

The storage unit 54 stores, in the road coordinate DB 30, each spatial index and a lane polygon corresponding to each spatial index. For example, as illustrated in FIG. 13, for the polygon 10, the storage unit 54 stores, in the road coordinate DB 30, data 30-3 in which the spatial index of the polygon 10 and the lane polygons of the lanes 3 to 10 in the Intersect relationship with the polygon 10 are associated with each other.

Processing Procedure of Road Coordinate Conversion Processing

Figure 14:
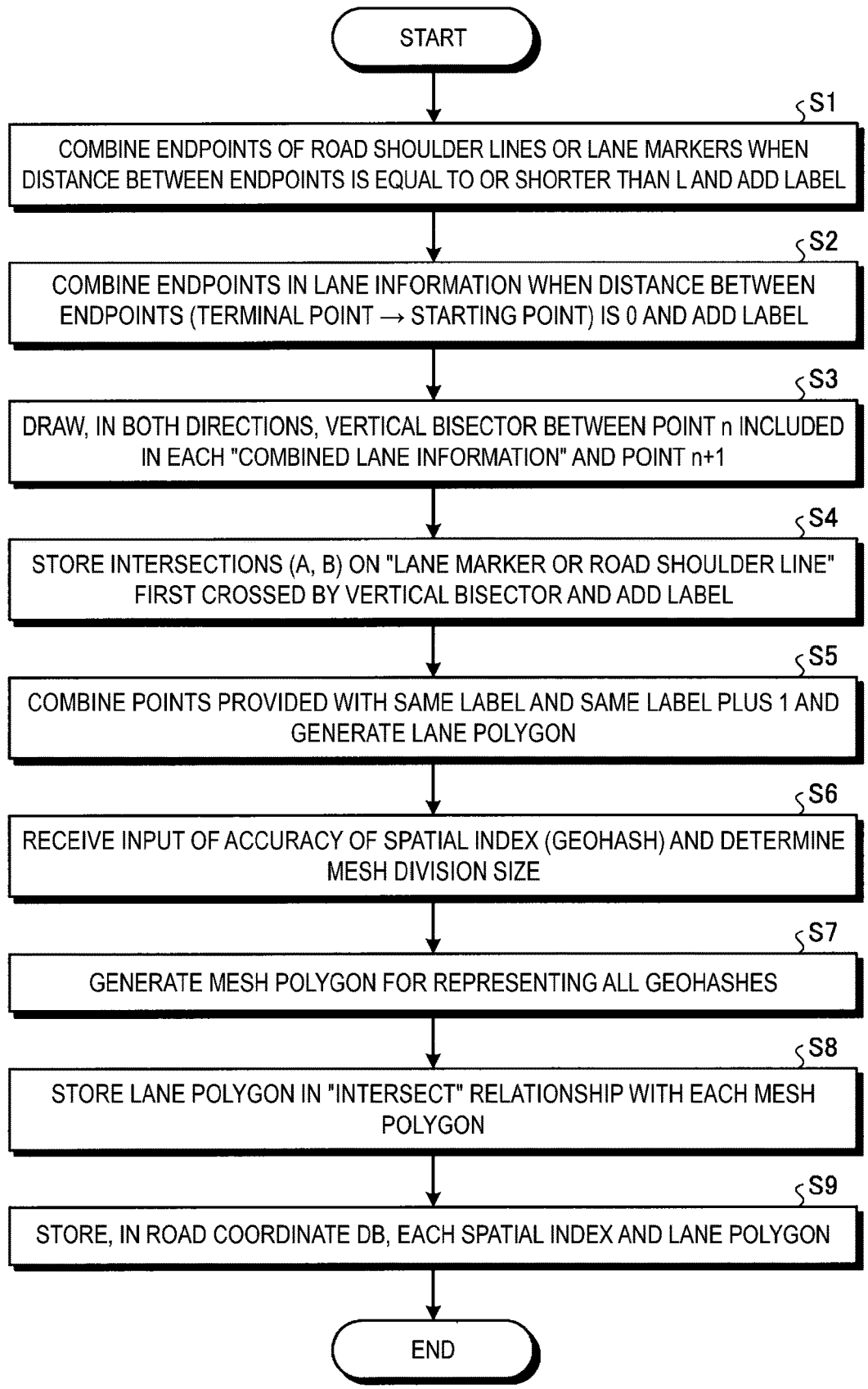
FIG. 14 is a flowchart illustrating a processing procedure for road coordinate conversion processing according to the present embodiment.

FIG. 14 is a flowchart illustrating a processing procedure for road coordinate conversion processing according to the present embodiment.

As illustrated in FIG. 14, the road coordinate conversion device 50 receives input of the road map data 40, and executes processing of generating a lane polygon. First, the lane polygon generation unit 52 refers to the road map data 40, and executes processing of combining the endpoints of two adjacent lane markers or the endpoints of the two adjacent lane markers when the distance between the endpoints of the two road shoulder lines or the distance between the endpoints of the two lane markers is equal to or shorter than L, and adding a label to the resultant road shoulder line or lane marker (step S1).

Next, the lane polygon generation unit 52 combines the endpoints of the lane information when the distance between the endpoints is 0, and adds a label (step S2). The lane polygon generation unit 52 draws, in both directions, a vertical bisector for a section between a point n included in the combined lane information and a point n+1 adjacent to the point n (step S3).

Next, the lane polygon generation unit 52 stores the intersections A and B on the lane marker or the road shoulder line first crossed by each vertical bisector, and adds a label (step S4). Then, the lane polygon generation unit 52 combines points provided with the same label and with the same label plus 1, and thus generates a lane polygon (step S5).

Next, upon receiving the input of the accuracy (number of digits) of the spatial index (geohash), the mesh polygon generation unit 53 determines the mesh division size in accordance with the input accuracy (step S6). The mesh polygon generation unit 53 then generates a mesh polygon for representing all geohashes in accordance with the determined mesh division (step S7). The mesh polygon generation unit 53 stores a lane polygon in an "Intersect" relationship with each mesh polygon (step S8).

Then, the storage unit 54 stores, in the road coordinate DB 30, each spatial index and a lane polygon corresponding to each spatial index (step S9), and the road coordinate conversion device 50 terminates the road coordinate conversion processing.

Effects of Embodiment

As described above, the road coordinate conversion device 50 according to the embodiment refers to the road map data including longitude/latitude data on lane information indicating the center line of a lane, longitude/latitude data on a road shoulder line, and longitude/latitude data on a lane marker, and generates a lane polygon indicating a region of a lane based on intersections on the lane marker or the road shoulder line crossed by a vertical line from the lane information.

In the present embodiment, a polygon lane polygon with the width information on the road accurately defined can be generated.

Figure 15:
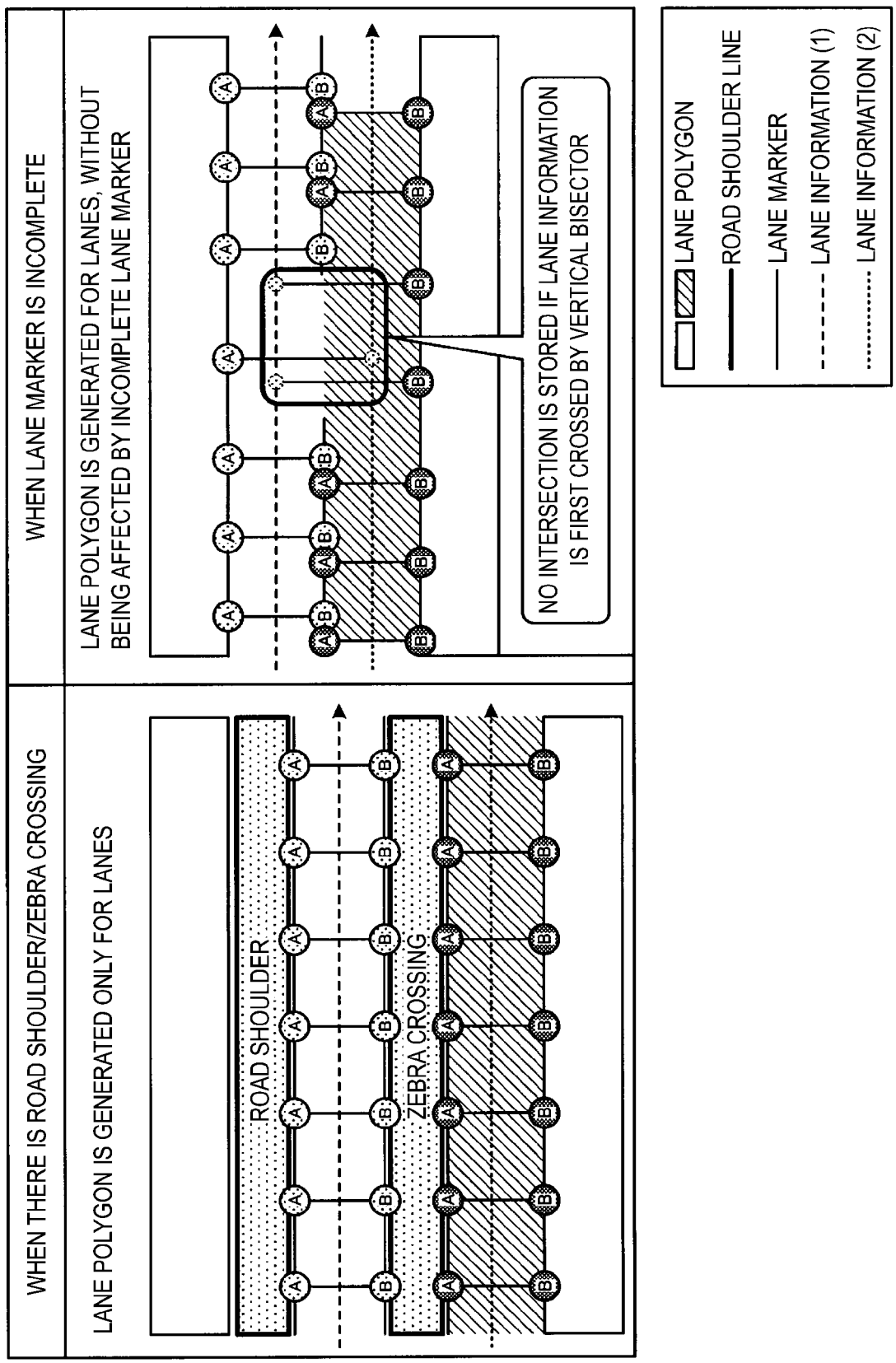
FIG. 15 is a diagram illustrating an example of a lane polygon that can be generated by the road coordinate conversion device.
Figure 16:
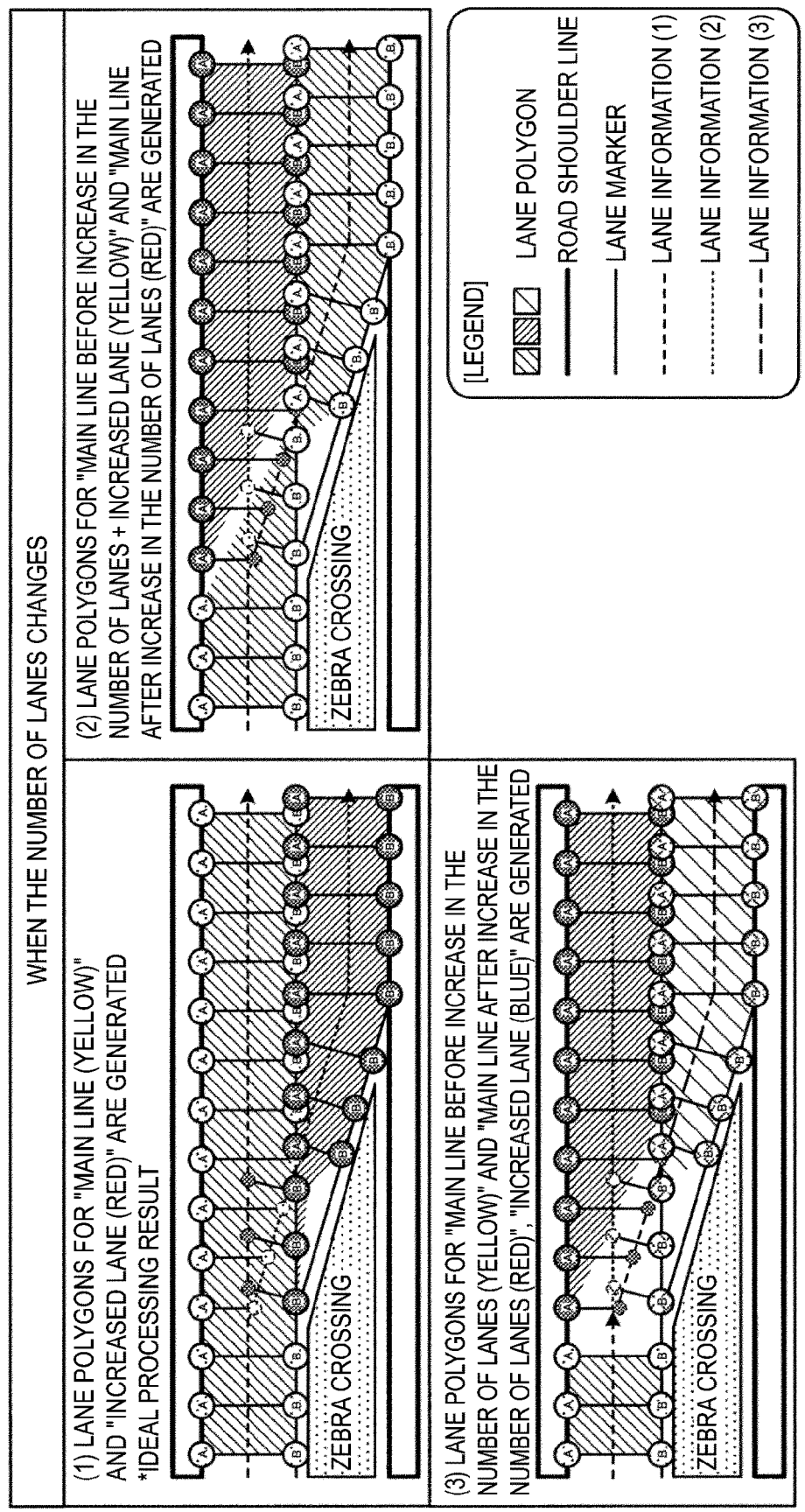
FIG. 16 is a diagram illustrating an example of a lane polygon that can be generated by the road coordinate conversion device.

FIG. 15 and FIG. 16 are diagrams illustrating an example of a lane polygon that can be generated by the road coordinate conversion device 50. As illustrated in FIG. 15, even when there is a road shoulder or a zebra crossing, the road coordinate conversion device 50 does not generate a lane polygon for the road shoulder or the zebra crossing, and generates a lane polygon only for lanes, because there is not lane information on the road shoulder or the zebra crossing. Also, as illustrated in FIG. 15, even when the lane marker is incomplete, the road coordinate conversion device 50 can generate a lane polygon for a lane, without being affected by the incomplete lane marker.

Furthermore, for example, when there are three or more pieces of lane information to be combined, the road coordinate conversion device 50 combines none of them. Thus, even when the number of lanes changes, lane polygons can be generated for "a main line before the increase in the number of lanes", "a main line after the increase in the number of lanes", and "an increased lane". Specifically, in a hypothetical case where three or more pieces of lane information are to be combined, a lane polygon is generated for the "main line" and the "increased lane" as illustrated as an example in (1) in FIG. 16, or is generated for the "main line before the increase in the number of lanes+the increased lane" and the "main line after the increase in the number of lanes" as an example in (2) in FIG. 16. The processing results in (1) in FIG. 16 is an ideal result, but there is no material for the determination to achieve such a result. Thus, when there are three or more pieces of lane information to be combined, the road coordinate conversion device 50 combines none of them. Thus, even when the number of lanes changes, as illustrated in (3) in FIG. 16, lane polygons can be generated for "a main line before the increase in the number of lanes", "a main line after the increase in the number of lanes", and "an increased lane".

The road coordinate conversion device 50 generates a mesh polygon representing a spatial index, and stores, in the road coordinate DB 30, the data on the mesh polygon and the data on the lane polygon corresponding to the mesh polygon in association with each other. Thus, the road coordinate DB 30 can output, to the spatiotemporal analysis application 10, the road coordinate search result D1 including a lane polygon that accurately represents the lane region.

The road coordinate conversion device 50 combines endpoints of two adjacent road shoulder lines when the distance between the endpoints of the two road shoulder lines is equal to or shorter than L, and combines endpoints of two adjacent lane markers when the distance between the endpoints of the two lane markers is equal to or shorter than L. The road coordinate conversion device 50 combines incomplete road shoulder lines and lane markers in the road map data 40 to correct the road shoulder lines and the lane markers, and thus can appropriately set non-road regions and the lane markers, whereby the lane polygon can be generated with higher accuracy.

System Configuration in Embodiment

The components of the road coordinate conversion device 50 illustrated in FIG. 2 are functional conceptual components and do not necessarily need to be physically configured as illustrated in the drawing. That is, the specific form of distribution and integration of the functions of the road coordinate conversion device 50 is not limited to the illustrated form, and the entirety or a portion of the form can be configured by being functionally or physically distributed and integrated in any unit, depending on various loads, usage conditions, and the like.

All or some types of processing performed by the road coordinate conversion device 50 may be implemented by a CPU and a program that is analyzed and executed by the CPU. The processing performed by the road coordinate conversion device 50 may be implemented as hardware based on a wired logic.

Further, all or some of the processing operations described as being automatically performed among the processing operations described in the embodiments may be manually performed. Alternatively, all or some of the processing operations described as being manually performed can be automatically performed using a publicly known method. In addition, the processing procedures, control procedures, specific names, and information including various types of data and parameters described and illustrated above can be appropriately changed unless otherwise specified.

Program

Figure 17:
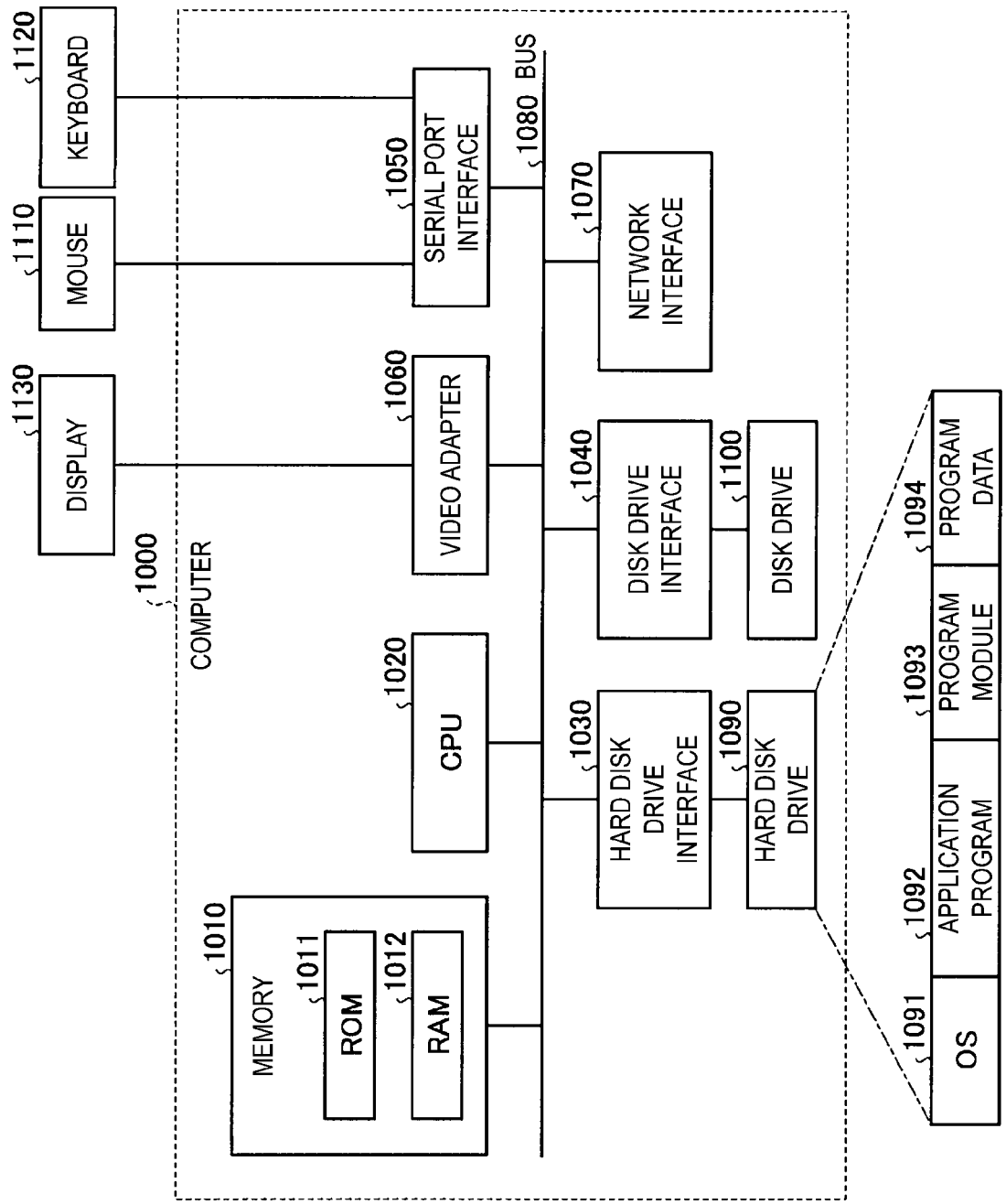
FIG. 17 is a diagram illustrating an exemplary computer that executes a program to implement the road coordinate conversion device.

FIG. 17 is a diagram illustrating an exemplary computer that executes a program to implement the road coordinate conversion device 50. A computer 1000 includes, for example, a memory 1010 and a CPU 1020. Further, the computer 1000 includes a hard disk drive interface 1030, a disk drive interface 1040, a serial port interface 1050, a video adapter 1060, and a network interface 1070. These units are connected by a bus 1080.

The memory 1010 includes a ROM 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. A removable storage medium such as a magnetic disk or optical disk, for example, is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an operating system (OS) 1091, an application program 1092, a program module 1093, and program data 1094. That is, a program defining each processing of the road coordinate conversion device 50 is implemented as the program module 1093 in which a code executable by the computer 1000 is described. The program module 1093 is stored in, for example, the hard disk drive 1090. For example, the program module 1093 for executing the same processing as that performed by the functional configurations in the road coordinate conversion device 50 is stored in the hard disk drive 1090. Further, the hard disk drive 1090 may be replaced with a solid state drive (SSD).

Further, configuration data to be used in the processing of the embodiments described above is stored as the program data 1094 in, for example, the memory 1010 or the hard disk drive 1090. In addition, the CPU 1020 reads out and executes the program module 1093 or the program data 1094 stored in the memory 1010 or the hard disk drive 1090, as necessary, in the RAM 1012.

The program module 1093 and the program data 1094 are not necessarily stored in the hard disk drive 1090, and may be stored in, for example, a removable storage medium and be read out by the CPU 1020 through the disk drive 1100 or the like. Alternatively, the program module 1093 and the program data 1094 may be stored in other computers connected via a network (a Local Area Network (LAN), a Wide Area Network (WAN), or the like). In addition, the program module 1093 and the program data 1094 may be read by the CPU 1020 from another computer through the network interface 1070.

Although the embodiments to which the invention made by the present inventor is applied have been described above, the present invention is not limited by the description and the drawings which constitute a part of the disclosure of the present invention according to the embodiments. That is, other embodiments, examples, operation technologies, and the like made by those skilled in the art based on the embodiments are all included in the scope of the present invention.

REFERENCE SIGNS LIST

100 Communication system
10 Spatiotemporal analysis application
20 Road coordinate management system
30 Road coordinate database (DB)
40 Road map data
50 Road coordinate conversion device
51 Reception unit
52 Lane polygon generation unit
53 Mesh polygon generation unit
54 Storage unit
60 Spatiotemporal DB
70 PIP processing module

The invention claimed is:

1. A generation device comprising:
processing circuitry configured to:
receive a plurality of inputs of road map data including first pairs of longitude data and latitude data on lane information indicating a center line of a lane, second pairs of longitude data and latitude data on a road shoulder line, and third pairs of longitude data and latitude data on a lane marker; and
refer to the road map data and generate a first polygon indicating a region of a lane based on a plurality of intersections on the lane marker or the road shoulder line crossed by a vertical line from the lane information.

2. The generation device according to claim 1, wherein the processing circuitry is further configured to:
generate a second polygon representing a spatial index, and
store data on the second polygon and data on the first polygon corresponding to the second polygon in a road coordinate database in association with each other.

3. The generation device according to claim 1, wherein the processing circuitry is further configured to generate the first polygon by combining the plurality of intersections on the lane marker or the road shoulder line crossed by the vertical line from the lane information.

4. The generation device according to claim 1, wherein the processing circuitry is further configured to combine endpoints of two adjacent road shoulder lines when a distance between the endpoints of the two adjacent road shoulder lines is equal to or shorter than a first distance, and combine endpoints of two adjacent lane markers when a distance between the endpoints of the two adjacent lane markers is equal to or shorter than a second distance.

5. A generation method executed by a generation device, the generation method comprising:
receiving a plurality of inputs of road map data including first pairs of longitude data and latitude data on lane information indicating a center line of a lane, second pairs of longitude data and latitude data on a road shoulder line, and third pairs of longitude data and latitude data on a lane marker; and referring to the road map data and generating a first polygon indicating a region of a lane based on a plurality of intersections on the lane marker or the road shoulder line crossed by a vertical line from the lane information.

6. A non-transitory computer-readable recording medium storing therein a generation program that causes a computer to execute a process comprising:

receiving a plurality of inputs of road map data including first pairs of longitude data and latitude data on lane information indicating a center line of a lane, second pairs of longitude data and latitude data on a road shoulder line, and third pairs of longitude data and latitude data on a lane marker; and referring to the road map data and generating a first polygon indicating a region of a lane based on a plurality of intersections on the lane marker or the road shoulder line crossed by a vertical line from the lane information.

\* \* \* \* \*